(12) United States Patent
Kim (10) Patent No.: US 7,896,644 B2
(45) Date of Patent: Mar. 1, 2011

(54) NOZZLE ASSEMBLY FOR AN INJECTOR

(75) Inventor: Jong-Soo Kim, Seoul (KR)

(73) Assignee: Hando Steel Co., Ltd. (KR)

( * ) Notice: Subject to any disclaimer, the term of this patent is extended or adjusted under 35 U.S.C. 154(b) by 68 days.

(21) Appl. No.: 12/311,789

(22) PCT Filed: Oct. 19, 2007

(86) PCT No.: PCT/KR2007/005141
§ 371 (c)(1),
(2), (4) Date: Apr. 13, 2009

(87) PCT Pub. No.: WO2008/050972
PCT Pub. Date: May 2, 2008

(65) Prior Publication Data
US 2010/0001102 A1     Jan. 7, 2010

(30) Foreign Application Priority Data
Oct. 23, 2006     (KR) .................. 10-2006-0103096

(51) Int. Cl.
*B29C 45/20*     (2006.01)
(52) U.S. Cl. ....................... 425/549; 425/568
(58) Field of Classification Search ............ 425/549, 425/568; 264/328.15
See application file for complete search history.

(56) References Cited

U.S. PATENT DOCUMENTS

| | | | |
|---|---|---|---|
| 3,913,796 A | 10/1975 | Aoki | |
| 5,273,417 A | 12/1993 | Nelson | |
| 5,783,234 A * | 7/1998 | Teng | 425/549 |
| 5,955,120 A * | 9/1999 | Deissler | 425/549 |

FOREIGN PATENT DOCUMENTS

| | | |
|---|---|---|
| GB | 2350814 A | 12/2000 |
| JP | 2003-136558 | 5/2003 |
| KR | 10-1990-0003287 B1 | 5/1990 |
| KR | 1990-0004225 | 5/1990 |
| KR | 10-0631267 B1 | 9/2006 |

OTHER PUBLICATIONS

International Application Serial No. PCT/KR2007/005141, International Search Report mailed Jan. 28, 2008, 3 pgs.
"International Application Serial No. PCT/KR2007/005141, Written Opinion mailed Jan. 28, 2008", 4 pgs.
"Australian Application Serial No. 2007409872, Notice of Acceptance dated Nov. 2, 2010", 3 pgs.

* cited by examiner

*Primary Examiner* — Tim Heitbrink
(74) *Attorney, Agent, or Firm* — Schwegman, Lundberg & Woessner, P.A.

(57) ABSTRACT

The present invention relates to a nozzle assembly for an injector that enables production of high quality injection products by effectively exhausting gas in a molten plastic flowing at a high speed. The present invention may include a body having a molten plastic pathway through which the molten plastic passes; a head, one end thereof being connected to the body and the other end thereof being provided with an injecting hole for injecting the molten plastic; a poppet mounted in the body, first and second plastic moving groves being formed in a length direction thereof at an exterior circumference thereof such that the molten plastic passes through the first and second plastic moving groves and gas in the molten plastic is extracted; and a first vent ring exhausting the extracted gas to the exterior of the body, the poppet being inserted in the first vent ring, wherein the molten plastic pathway is only communicated with the second plastic moving groove.

28 Claims, 12 Drawing Sheets

NOZZLE ASSEMBLY FOR AN INJECTOR

CROSS REFERENCE TO RELATED APPLICATION

This application is a nationalization under 35 U.S.C. 371 of PCT/KR2007/005141, filed Oct. 19, 2007 and published as WO 2008/050972 A1 on May 2, 2008, which application claims priority to and the benefit of Korean Patent Application No. 10-2006-0103096 filed on Oct. 23, 2006, which applications and publication are incorporated herein by reference and made a part hereof.

TECHNICAL FIELD

The present invention relates to a nozzle assembly for an injector. More particularly, the present invention relates to a nozzle assembly for an injector that enables manufacture of high quality injection products by effectively exhausting gas in a molten plastic flowing at a high speed.

BACKGROUND ART

Injection molding is a typical method of molding thermoplastics. In injection molding, products are made by injecting molten plastic into a mold. Therefore, a nozzle for injecting molten plastic into a mold is mounted in an injector.

An injecting nozzle pressure feeds and supplies molten plastic to an injecting mold by using a screw cylinder. Such an injecting nozzle is disclosed in Korean Patent Publication number 100631267 which corresponds to application number 1020050046693 (hereinafter called "prior patent").

Figure 1:
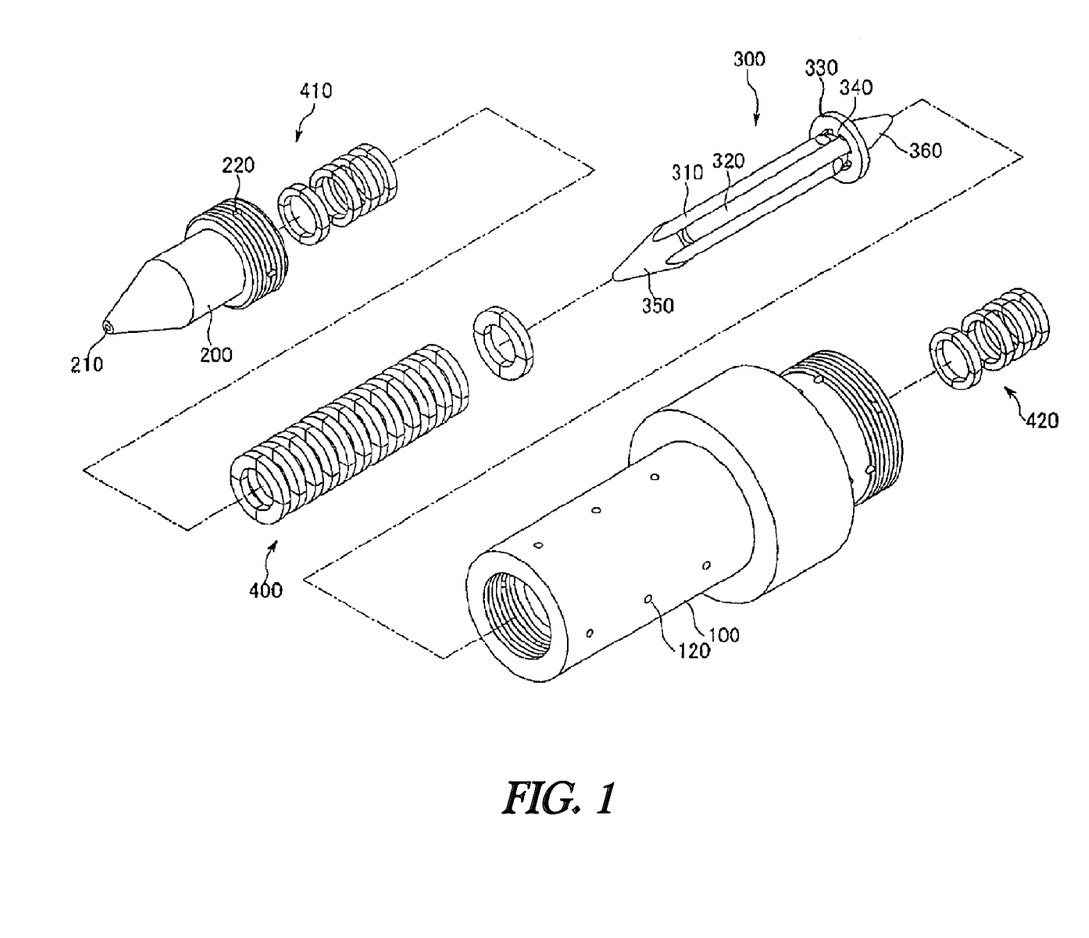
FIG. 1 is a perspective view showing an exploded nozzle assembly for an injector according to the first exemplary embodiment of the present invention.

According to the prior patent, an injecting nozzle, as shown in FIG. 1, includes a body 10, a head 20, a poppet 30, and a vent ring 40.

One end of the body 10 is connected to a cylinder (not shown) of an injector, and molten plastic is supplied from the cylinder to the body 10. The other end of the body 10 is coupled with the head 20.

A molten plastic pathway 12 is formed in the body 10, and the poppet 30 and the vent ring 40 are mounted in the molten plastic pathway 12.

The vent ring 40 is inserted in the poppet 30, and a plurality of protrusions 42 are radially protruded at one side of the vent ring 40. Therefore, when the molten plastic passes through an exterior circumference of the poppet 30, gas in the molten plastic is extracted to a space between the vent rings 40.

In addition, a gas exhaust hole 14 is formed from an interior circumference of the body 10 to an exterior circumference of the body 10, and the extracted gas is exhausted to the exterior of the body 10 through the gas exhaust hole 14.

An injecting hole 22 is formed at one end of the head 20. The molten plastic supplied through the molten plastic pathway 12 passes around the exterior circumference of the poppet 30 and is supplied to a mold (not shown) through the injecting hole 22 of the head 20.

However, the gas in the molten plastic is exhausted when the molten plastic passes around the exterior circumference of the poppet 30, but techniques for effectively extracting the gas from the molten plastic are not disclosed according to the prior utility. Therefore, a large amount of gas is contained in the molten plastic injected through the injecting hole 22, and inferior products are produced due to the gas.

In addition, since the vent ring 40 does not effectively extract the gas from the molten plastic, an additional drier may be needed in order to dry the gas in the molten plastic. Therefore, equipment may be complex and product cost may be high.

DETAILED DESCRIPTION OF INVENTION

It is an object of the present invention to provide a nozzle assembly for an injector having advantages of making high quality injection products by effectively exhausting gas in a molten plastic flowing with a high speed.

To achieve the above mentioned object, a nozzle assembly for an injector according to a first exemplary embodiment of the present invention may include: a body having a molten plastic pathway through which molten plastic passes; a head, one end thereof being connected to the body and the other end thereof being provided with an injecting hole for injecting the molten plastic; a poppet mounted in the body, first and second plastic moving grooves being formed in a length direction thereof at an exterior circumference thereof such that the molten plastic passes through the first and second plastic moving grooves and gas in the molten plastic is extracted; and a first vent ring exhausting the extracted gas to the exterior of the body, the poppet being inserted in the first vent ring, wherein the molten plastic pathway is only communicated with the second plastic moving groove.

The first plastic moving groove may be opened toward the head and the second plastic moving groove be blocked toward the head.

A vent ring support may be formed at one side portion of the poppet, and a connecting hole communicating the molten plastic pathway with the second plastic moving groove may be formed at the vent ring support.

The poppet may include a shaft; a cone coupled with one end of the shaft and provided with the vent ring support at which the connecting hole communicating the molten plastic pathway with the second plastic moving groove is formed; and a plurality of second vent rings, the shaft being inserted therein and the first and second plastic moving grooves being formed at an exterior circumference thereof.

The first vent ring may include a first protrusion portion protruded at an exterior circumference of one side of the first vent ring along a length direction thereof; a second protrusion portion protruded at an interior circumference of the one side of the first vent ring along the length direction thereof; and a gas storage area formed between the first protrusion portion and the second protrusion portion.

A first exemplary first vent ring according to an exemplary embodiments of the present invention may be divided radially into a plurality of sections.

A gas moving groove may be formed radially at the first protrusion portion of a second exemplary first vent ring.

In addition, a gas groove communicated with the gas moving groove may be formed at an exterior circumference of the first vent ring.

A gas moving hole may be formed from an interior circumference of a third exemplary first vent ring to an exterior circumference of the third exemplary first vent ring.

In the first vent ring according to the exemplary embodiments of present invention, the first protrusion portion may be protruded more than the second protrusion portion by a predetermined length.

A fourth exemplary first vent ring may be made of sintered metal.

At least one minute groove for exhausting the gas in the molten plastic may be formed at one side of a fifth exemplary first vent ring.

The depth of the minute groove may be within 0.001-0.01 mm.

A first gas exhaust hole for exhausting the extracted gas to an exterior of the body may be formed from an interior circumference of the body to an exterior circumference of the body.

The first vent ring may be inserted in the head.

A second gas exhaust hole may be formed from an interior circumference of the head to an exterior circumference of the head.

The first gas exhaust hole may be connected with a vacuum pump.

A nozzle assembly for an injector according to a second exemplary embodiment of the present invention may include a body having a molten plastic pathway through which molten plastic passes; a head, one end thereof being connected to the body and the other end thereof being provided with an injecting hole for injecting the molten plastic; a supporting cylinder mounted in the body, a plurality of supporting grooves being formed at the supporting cylinder; a poppet mounted in the supporting cylinder, first and second plastic moving grooves being formed in a length direction thereof at an exterior circumference thereof such that the molten plastic passes through the first and second plastic moving grooves and gas in the molten plastic is extracted; and a vent ring member divided into a plurality of sections, the plurality of sections being inserted respectively in the supporting grooves.

The molten plastic pathway may be only communicated with the second plastic moving groove.

The first plastic moving groove may be opened toward the head and the second plastic moving groove is blocked toward the head.

A vent ring support may be formed at one side portion of the poppet, and a connecting hole communicating the molten plastic pathway with the second plastic moving groove may be formed at the vent ring support.

A plurality of supporting cylinder protrusions formed between the supporting grooves may be alternately disposed apart from poppet protrusions formed between the first and second plastic moving grooves by a predetermined distance.

The vent ring member may include a first protrusion portion protruded at an exterior circumference of one side of the vent ring member along a length direction thereof, a second protrusion portion protruded at an interior circumference of the one side of the vent ring member along the length direction thereof, and a gas storage area formed between the first protrusion portion and the second protrusion portion.

The first protrusion portion may be protruded more than the second protrusion portion by a predetermined length.

A first gas exhaust hole for exhausting the extracted gas to an exterior of the body may be formed from an interior circumference of the body to an exterior circumference of the body.

The first gas exhaust hole may be connected with a vacuum pump.

A third gas exhaust hole may be formed at the supporting groove.

The vent ring member may be made of sintered metal.

DESCRIPTION OF REFERENCE NUMERALS INDICATING PRIMARY ELEMENTS IN THE DRAWINGS

| | |
|---|---|
| 100: body | 110: molten plastic pathway |
| 120: first gas exhaust hole | 200: head |
| 210: injecting hole | 220: second gas exhaust hole |
| 300: poppet | 310: first plastic moving groove |
| 320: second plastic moving groove | 330: vent ring support |
| 340: connecting hole | 350, 360: cone |
| 370: shaft | 380: second vent ring |
| 400, 410, 420: first vent ring | 405: gas storage area |
| 430: first protrusion portion | 440: second protrusion portion |
| 450: gas moving groove | 460: gas moving hole |

BEST MODE

Hereinafter, referring the accompanying drawings, a nozzle assembly for an injector according to exemplary embodiments of the present invention will be described in detail.

Figure 2:
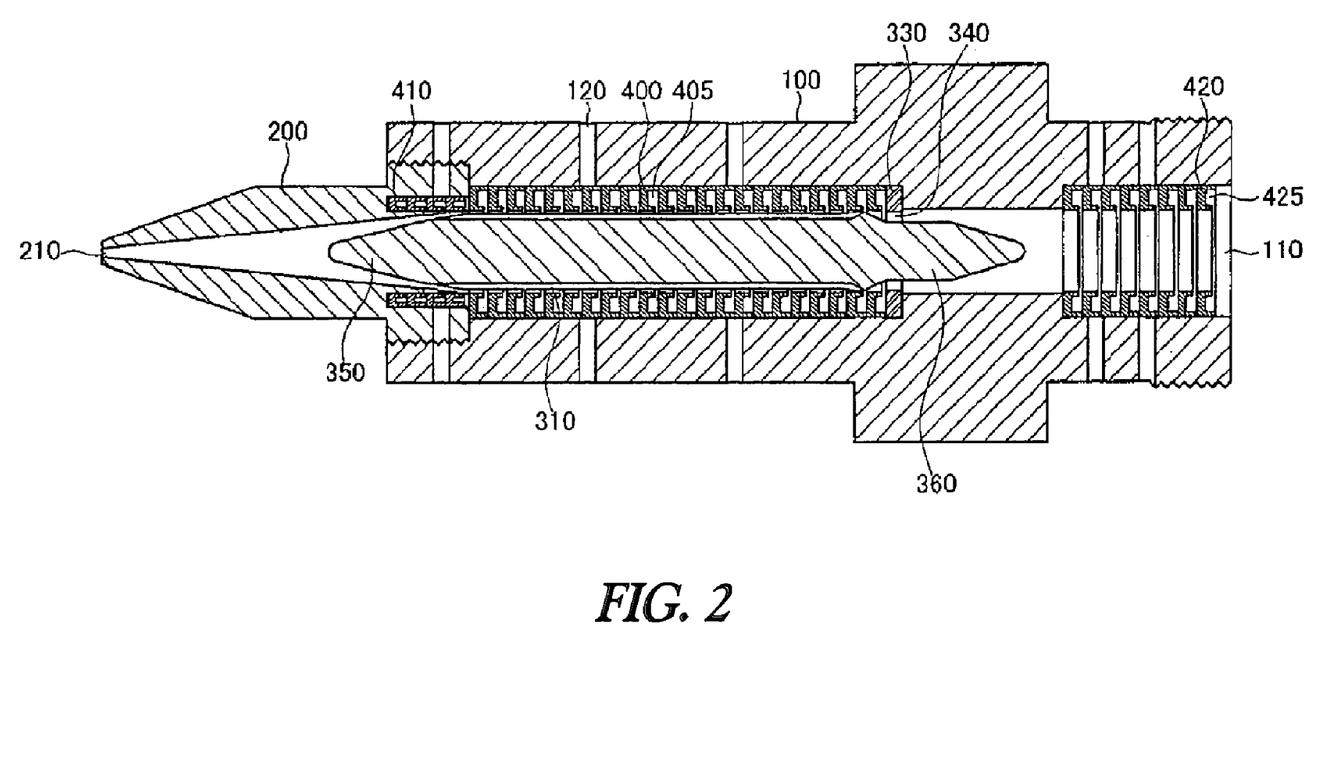
FIG. 2 is a cross-sectional view showing a combined nozzle assembly for an injector according to the first exemplary embodiment of the present invention.

FIG. 1 is a perspective view showing an exploded nozzle assembly for an injector according to the first exemplary embodiment of the present invention, and FIG. 2 is a cross-sectional view showing a combined nozzle assembly for an injector according to the first exemplary embodiment of the present invention.

As shown in FIG. 1 and FIG. 2, a nozzle assembly for an injector according to the first exemplary embodiment of the present invention includes a body 100, a head 200, a poppet 300, and first vent rings 400, 410, and 420.

The body 100 has a hollow cylindrical shape. One end of the body 100 is communicated with a cylinder (not shown) and receives molten plastic, and the other end of the body 100 is coupled to the head 200.

A molten plastic pathway 110 is formed in the body 100. Therefore, the molten plastic supplied through the one end of the body 100 is supplied to the head 200 through the molten plastic pathway 110.

In addition, the first vent ring 420 for exhausting gas from the molten plastic may be inserted in a rear portion of the body 100.

Further, a first gas exhaust hole 120 is formed at the body 100. The first gas exhaust hole 120 is communicated from an interior circumference of the body 100 to an exterior circumference of the body 100. The gas in the molten plastic is exhausted to the exterior of the body 100 through the first gas exhaust hole 120.

One end of the head 200 is coupled with the body 100, and an injecting hole 210 is formed at the other end of the head 200 in order to inject the molten plastic into a mold (not shown).

The body 100 may be screwed to the head 200. That is, a screw thread is formed at an exterior circumference of one end of the head 200, and another screw thread is formed at an interior circumference of one end of the body 100 such that the body 100 is screwed to the head 200.

The interior diameter of the head 200 is gradually reduced from the other end of the body 100 to the injecting hole 210 such that the molten plastic having a target diameter is injected.

In addition, the first vent ring 410 for exhausting gas from the molten plastic may be inserted in the head 200, and a second gas exhaust hole 220 is formed from an interior circumference of the head 200 to an exterior circumference of the head 200 such that the gas is exhausted to the exterior of the head 200.

Therefore, the gas may be more removed from the molten plastic and thus quality of injected products may be improved.

Cones 350 and 360 are formed at respective ends of the poppet 300, and first and second plastic moving grooves 310 and 320 are formed in the length direction of the poppet 300 at an exterior circumference thereof.

Figure 3:
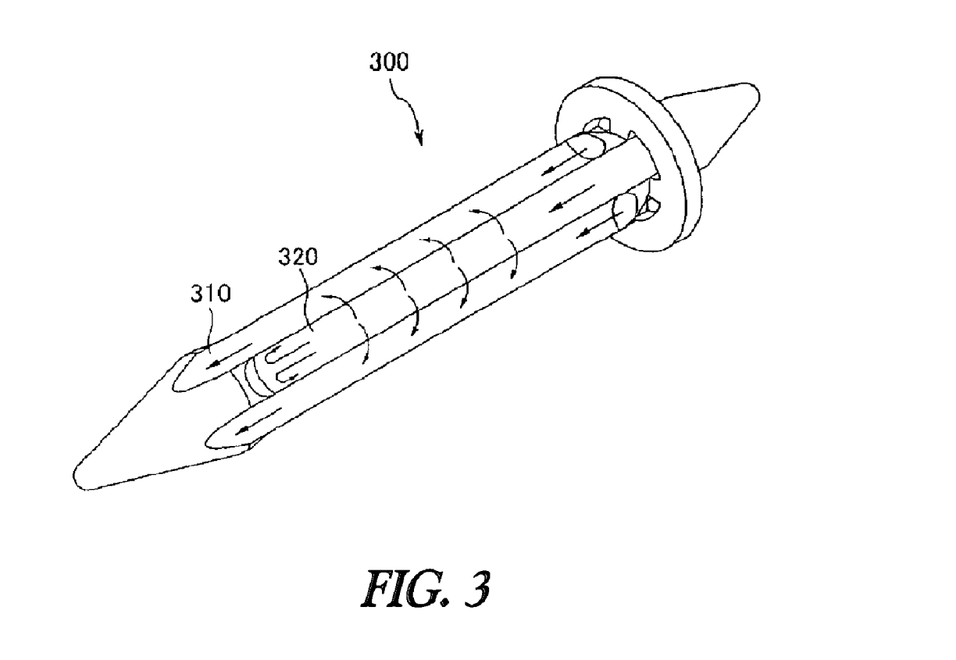
FIG. 3 is a perspective view showing one exemplary poppet used in a nozzle assembly for an injector according to the first exemplary embodiment of the present invention.

Referring to FIG. 3, an exemplary poppet will be described in detail.

FIG. 3 is a perspective view showing one exemplary poppet used in a nozzle assembly for an injector according to the first exemplary embodiment of the present invention.

As shown in FIG. 1 to FIG. 3, the cones 350 and 360 are integrally formed at respective ends of the poppet 300, and a vent ring support 330 is integrally formed at one end portion of poppet 300. A plurality of connecting holes 340 are formed at the vent ring support 330.

The first and second plastic moving grooves 310 and 320 are formed in the length direction of the poppet 300 at the exterior circumference thereof, and the first plastic moving groove 310 is opened toward the head 200 while the second plastic moving groove 320 is blocked toward the head 200.

In addition, the connecting hole 340 communicates the molten plastic pathway 110 with the second plastic moving groove 320.

Therefore, the molten plastic supplied to the molten plastic pathway 110 is moved toward the head 200 through the second plastic moving groove 320. After that, the molten plastic cannot move due to the blocked second plastic moving groove 320 and crosses to the first plastic moving groove 310 next to the blocked second plastic moving groove 320. At this time, the molten plastic is flattened thinly and evenly, and the gas in the molten plastic is effectively extracted.

The molten plastic is then moved toward the head 200 through the first plastic moving groove 310 and is injected to the mold through the injecting hole 210.

Figure 4:
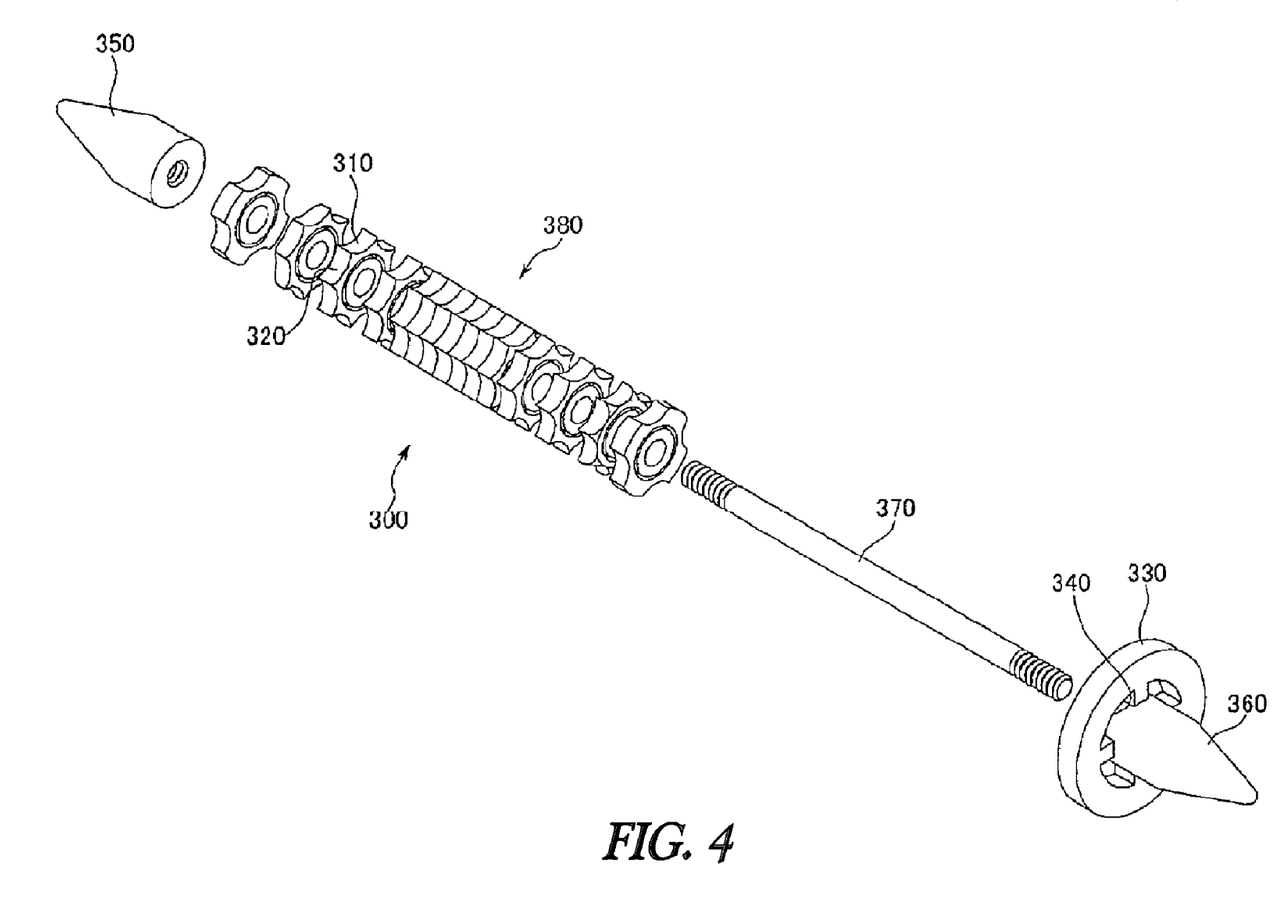
FIG. 4 is an exploded perspective view showing another exemplary poppet used in a nozzle assembly for an injector according to the first exemplary embodiment of the present invention.

Referring to FIG. 4, another exemplary poppet will be described in detail.

FIG. 4 is an exploded perspective view showing another exemplary poppet used in a nozzle assembly for an injector according to the first exemplary embodiment of the present invention.

As shown in FIG. 4, another exemplary poppet 300 includes a shaft 370, cones 350 and 360, and a plurality of the second vent rings 380.

The cones 350 and 360 are coupled to respective ends of the shaft 370.

In addition, the vent ring support 330 is integrally formed at one cone 360, and a plurality of connecting holes 340 are formed at the vent ring support 330.

The plurality of second vent rings 380 may be conventional vent rings, and the first and second plastic moving grooves 310 and 320 are each formed at an exterior circumference of each second vent ring 380. The shaft 370 is inserted through the plurality of the second vent rings 380.

In addition, only the first plastic moving groove 310 is formed at the second vent ring 380 closest to the head 200. That is, the first and second plastic moving grooves 310 and 320 formed at respective second vent rings 380 are aligned in order to form pathways through which the molten plastic can move, and the pathway formed by aligning the second plastic moving groove 320 is blocked toward the head 200.

In addition, the connecting hole 340 communicates the molten plastic pathway 110 with the second plastic moving groove 320.

Therefore, the molten plastic is moved through the second plastic moving groove 320 and crosses to the first plastic moving groove 310 next to the blocked second plastic moving groove 320 such that the gas is extracted. Thereafter, the molten plastic is injected to the mold through the injecting hole 210 of the head 200.

The poppet 300 is inserted into the first vent ring 400 and exhausts the extracted gas to the exterior of the body 100.

Figure 5:
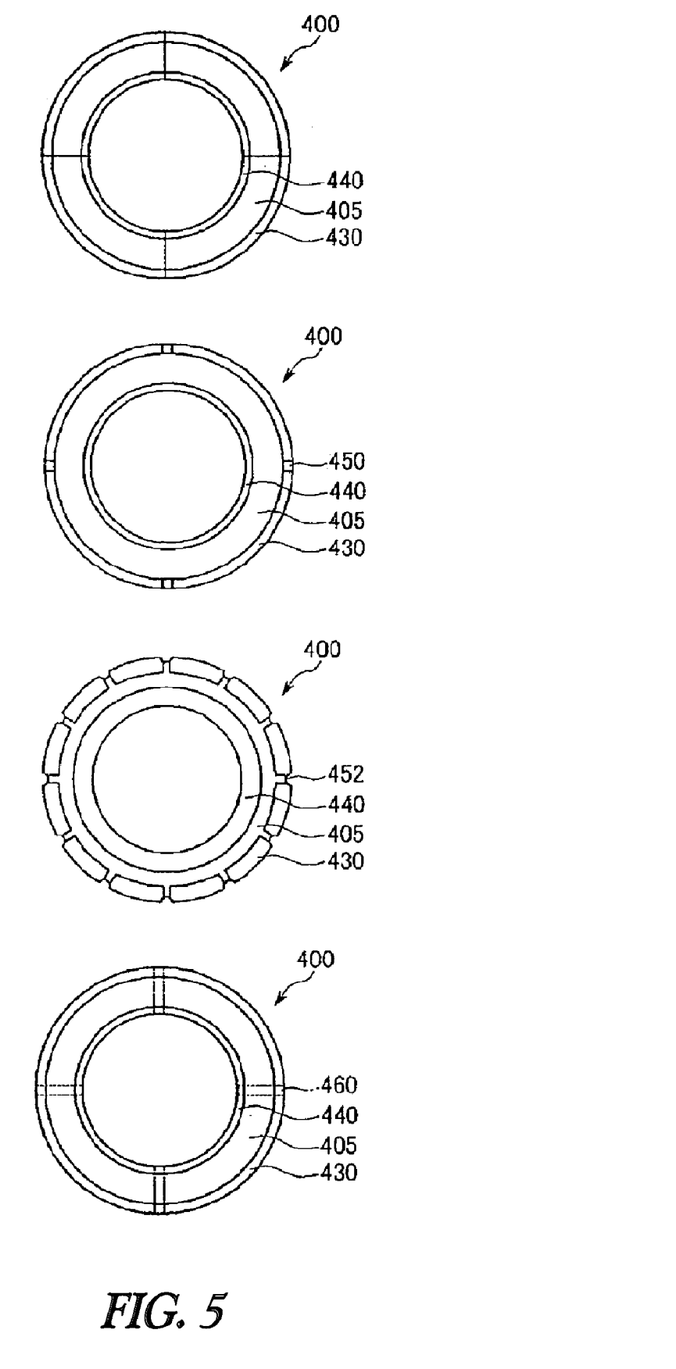
FIG. 5 is a front view showing exemplary first vent rings used in a nozzle assembly for an injector according to the first exemplary embodiment of the present invention.
Figure 6:
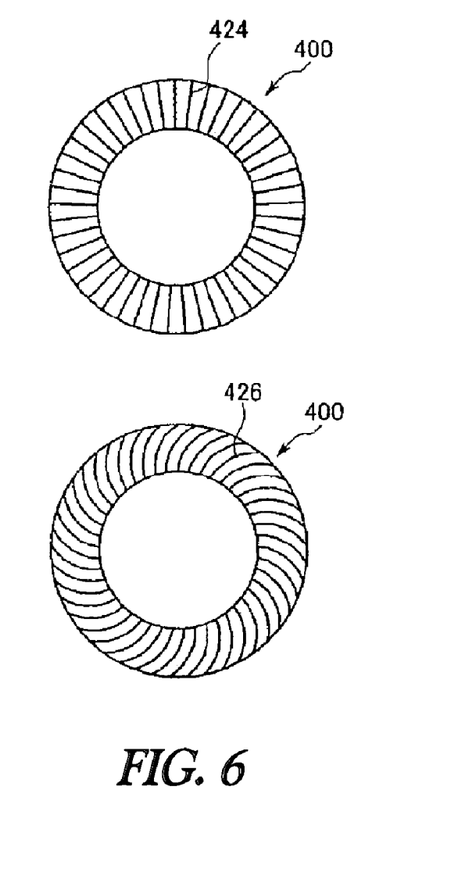
FIG. 6 is a front view showing other exemplary first vent rings used in a nozzle assembly for an injector according to the first exemplary embodiment of the present invention.

Referring to FIG. 5 and FIG. 6, the first vent ring will be described in detail.

FIG. 5 is a front view showing exemplary first vent rings used in a nozzle assembly for an injector according to the first exemplary embodiment of the present invention, and FIG. 6 is a front view showing other exemplary first vent rings used in a nozzle assembly for an injector according to the first exemplary embodiment of the present invention.

As shown in FIG. 5, the first vent ring 400 includes a first protrusion portion 430, a second protrusion portion 440, and a gas storage area 405.

The first protrusion portion 430 is protruded at an exterior circumference of one side of the first vent ring 400 along a length direction thereof.

The second protrusion portion 440 is protruded at an interior circumference of the one side of the first vent ring 400 along length direction thereof.

The gas storage area 405 is formed between the first protrusion portion 430 and the second protrusion portion 440.

In addition, the first protrusion portion 430 is protruded more than the second protrusion portion 440 by a predetermined length. The predetermined length may be a value that a person of ordinary skill in the art thinks preferable. The predetermined length may be 0.01-0.1 mm.

In a case in which the first vent rings 400 are closely contacted with each other, a minute gap is formed between interior circumferences of the first vent rings 400 but exterior circumferences of the first vent rings 400 are closely contacted. Therefore, the gas extracted from the molten plastic is collected in the gas storage area 405 through the minute gap.

As shown in FIG. 5A, one exemplary first vent ring 400 is divided radially into a plurality of sections. A minute gap is formed between respective sections, and the gas is exhausted through the minute gap. The number of sections can be arbitrarily chosen by a person of ordinary skill in the art.

As shown in FIG. 5B, gas moving grooves 450 are formed radially at the first protrusion portion 430, and the gas is exhausted through the gas moving grooves 450 according to another exemplary first vent ring 400.

In addition, as shown in FIG. 5C, a gas groove 452 connected to the gas moving grooves 450 may be formed at an exterior circumference of the first vent ring 400. In this case, since the gas flows through the gas groove 452 and is exhausted, gas exhaust may further increase.

As shown in FIG. 5D, a gas moving hole 460 is formed from an interior circumference of the first vent ring 400 to an exterior circumference of the first vent ring 400, and the gas is exhausted through the gas moving hole 460 according to another first vent ring 400.

Instead of forming the first and second protrusion portions 430 and 440 at the first vent ring 400, at least one minute groove 424 may be formed at one side or both sides of the first vent ring 400, as shown in FIG. 6. In this case, the gas in the molten plastic is exhausted through the minute groove 424 by pressure. The depth of the minute groove 424 may be arbitrarily set by a person of ordinary skill in the art. Preferably, the depth of the minute groove 424 may be 0.001-0.01 mm. In addition, the shape of the minute groove 424 may be linear or spiral.

Further, according to the first exemplary nozzle assembly for an injector of the present invention, the first vent ring 400 may be made of sintered metal. In this case, the gas in the molten plastic is exhausted through cavities formed between particles of sintered metal that are formed in the first vent ring 400.

Hereinafter, operation of the nozzle assembly for an injector according to the first exemplary embodiment of the present invention will be described.

The molten plastic supplied to the molten plastic pathway 110 is supplied to the second plastic moving groove 320 through the connecting hole 340, and flows through the second plastic moving groove 320. However, since one end of the second plastic moving groove 320 is blocked, flow of the molten plastic is hindered and the molten plastic crosses to the first plastic moving groove 310 next to the second plastic moving groove 320. After that, the molten plastic flows through the first plastic moving groove 310. In this case, the molten plastic is flattened thinly and evenly, and the gas in the molten plastic is effectively extracted.

The extracted gas is collected in the gas storage area 405 through a gap formed between the first vent rings 400. Further, the extracted gas may be collected in the gas storage area 405 through a gap formed between sections of the first vent ring 400. After that, the collected gas flows to an interior circumference of the body 100 through a gap formed between sections of the first vent ring 400, and is exhausted to the exterior of the body 100 through the first gas exhaust hole 120 formed at the body 100.

Hereinafter, a nozzle assembly for an injector according to the second exemplary embodiment of the present invention will be described in detail. Detailed descriptions of elements of a nozzle assembly for an injector according to the second exemplary embodiment of the present invention that are the same as those of a nozzle assembly for an injector according to the first exemplary embodiment of the present invention will be omitted.

Figure 7:
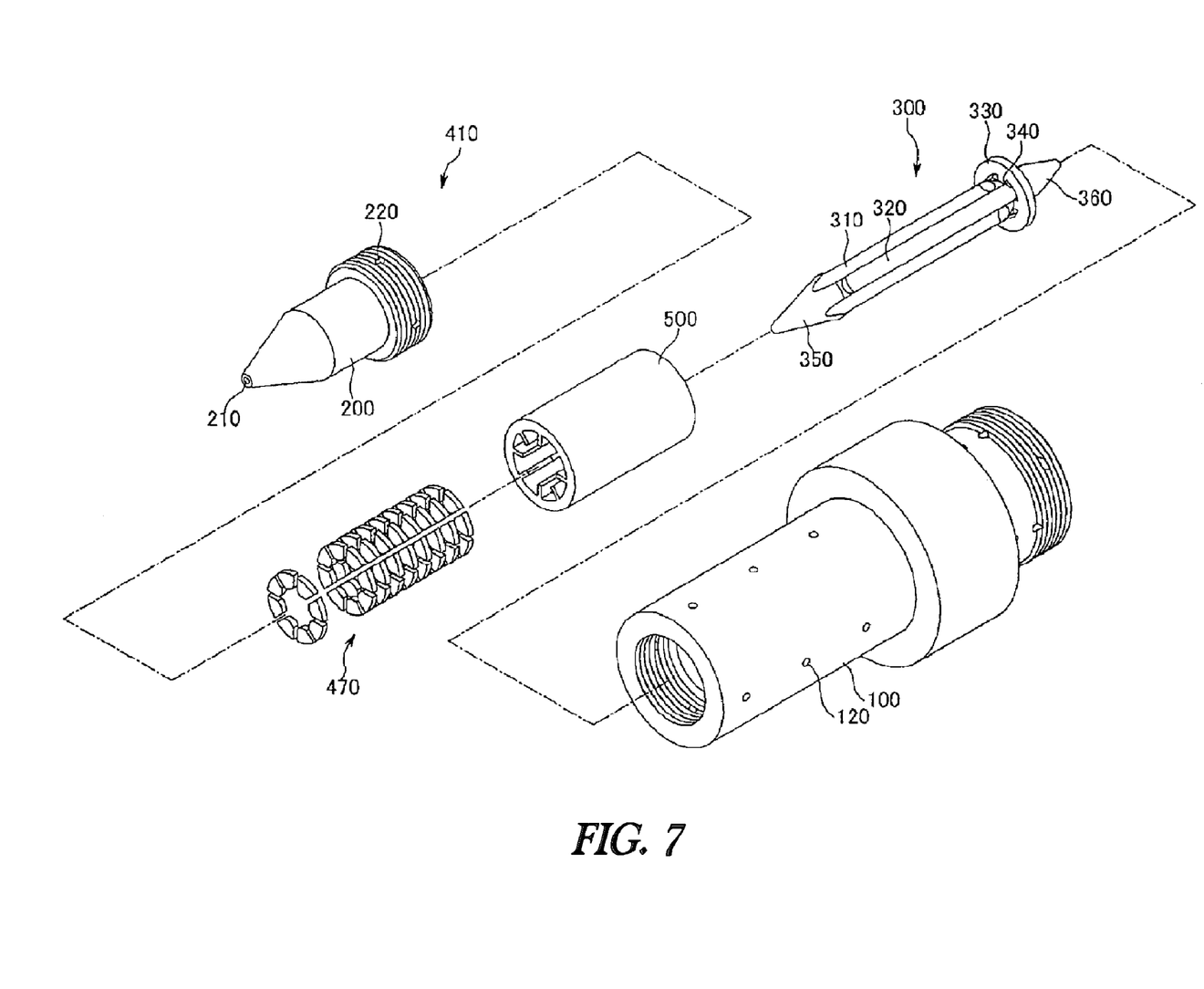
FIG. 7 is a perspective view showing an exploded nozzle assembly for an injector according to the second exemplary embodiment of the present invention.
Figure 8:
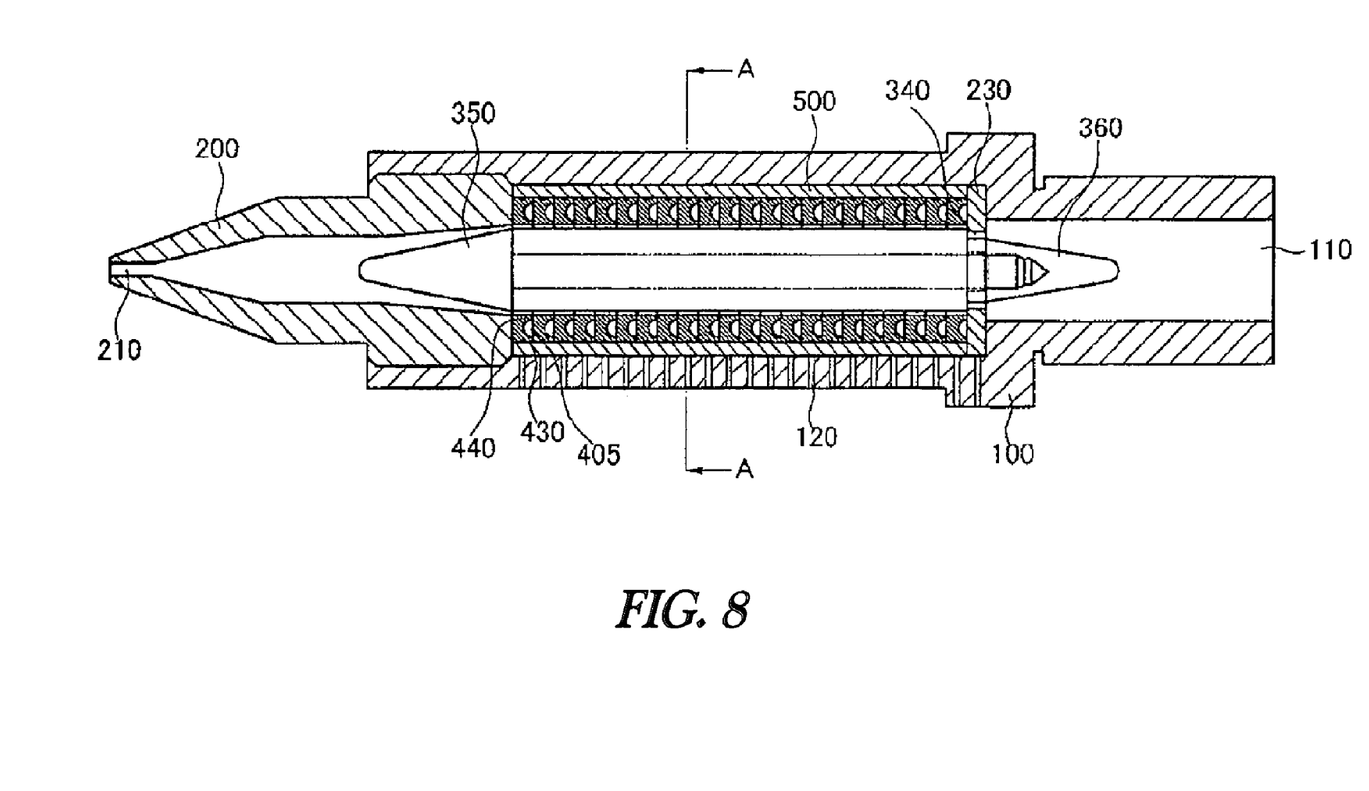
FIG. 8 is a cross-sectional view showing a combined nozzle assembly for an injector according to the second exemplary embodiment of the present invention.
Figure 9:
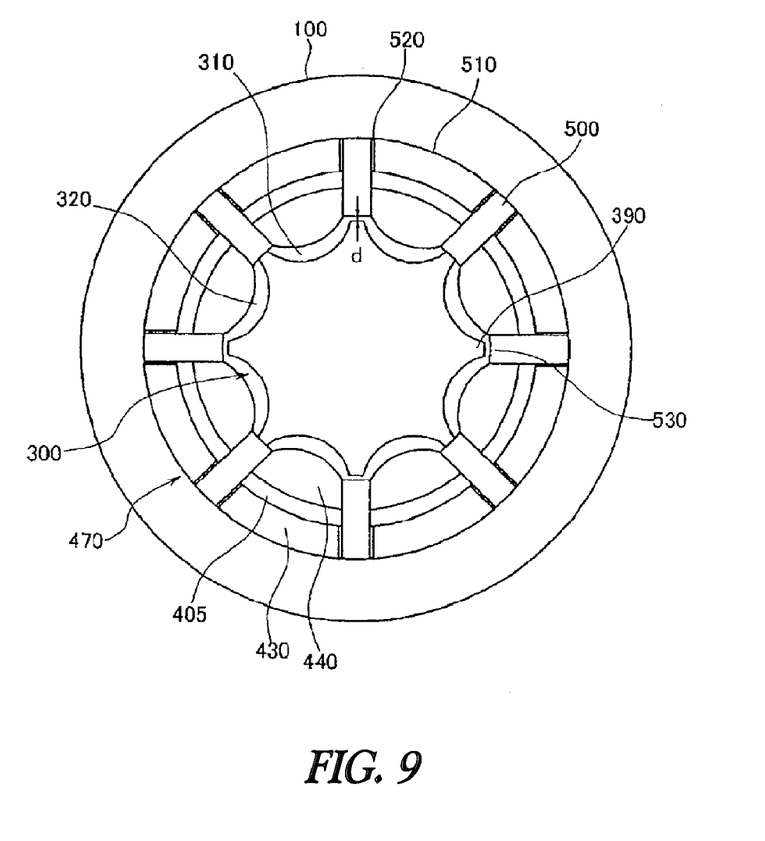
FIG. 9 is a cross-sectional view taken along the line A-A in FIG. 7.

FIG. 7 is a perspective view showing an exploded nozzle assembly for an injector according to the second exemplary embodiment of the present invention, FIG. 8 is a cross-sectional view showing a combined nozzle assembly for an injector according to the second exemplary embodiment of the present invention, and FIG. 9 is a cross-sectional view taken along the line A-A in FIG. 7.

As shown in FIG. 7 to FIG. 9, a nozzle assembly for an injector according to the second exemplary embodiment of the present invention includes a body 100, a head 200, a supporting cylinder 500, a poppet 300, and a vent ring member 470.

One end of the body 100 is communicated with a cylinder (not shown), and the other end of the body 100 is coupled to the head 200. A molten plastic pathway 110 is formed in the body 100.

One end of the head 200 is coupled with the body 100, and an injecting hole 210 is formed at the other end of the head 200.

Figure 11:
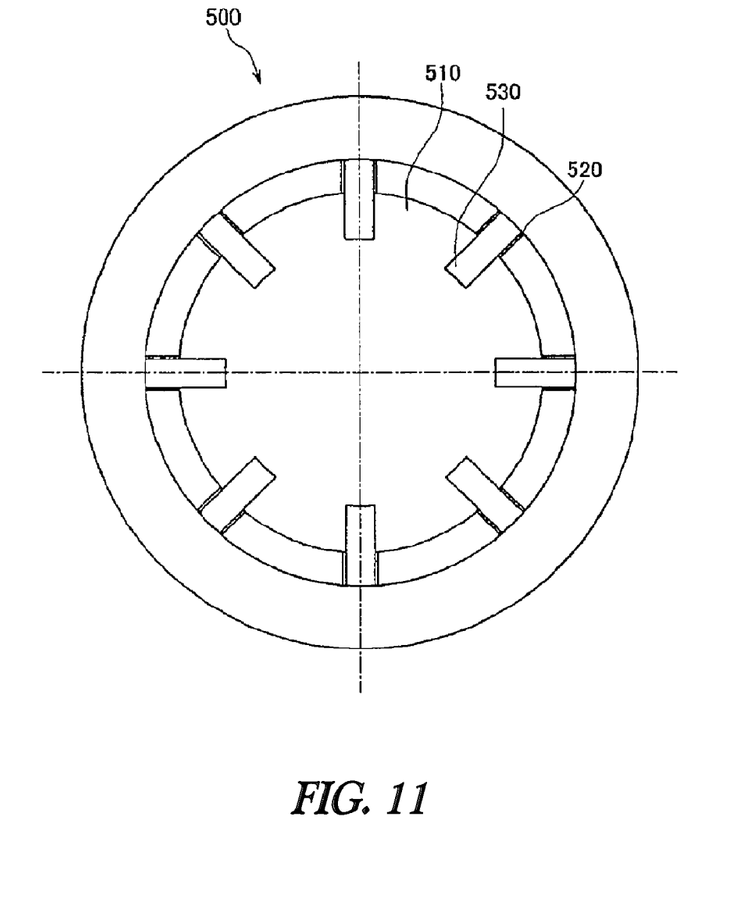
FIG. 11 is a front view showing a supporting cylinder of a nozzle assembly for an injector according to the second exemplary embodiment of the present invention.
Figure 12:
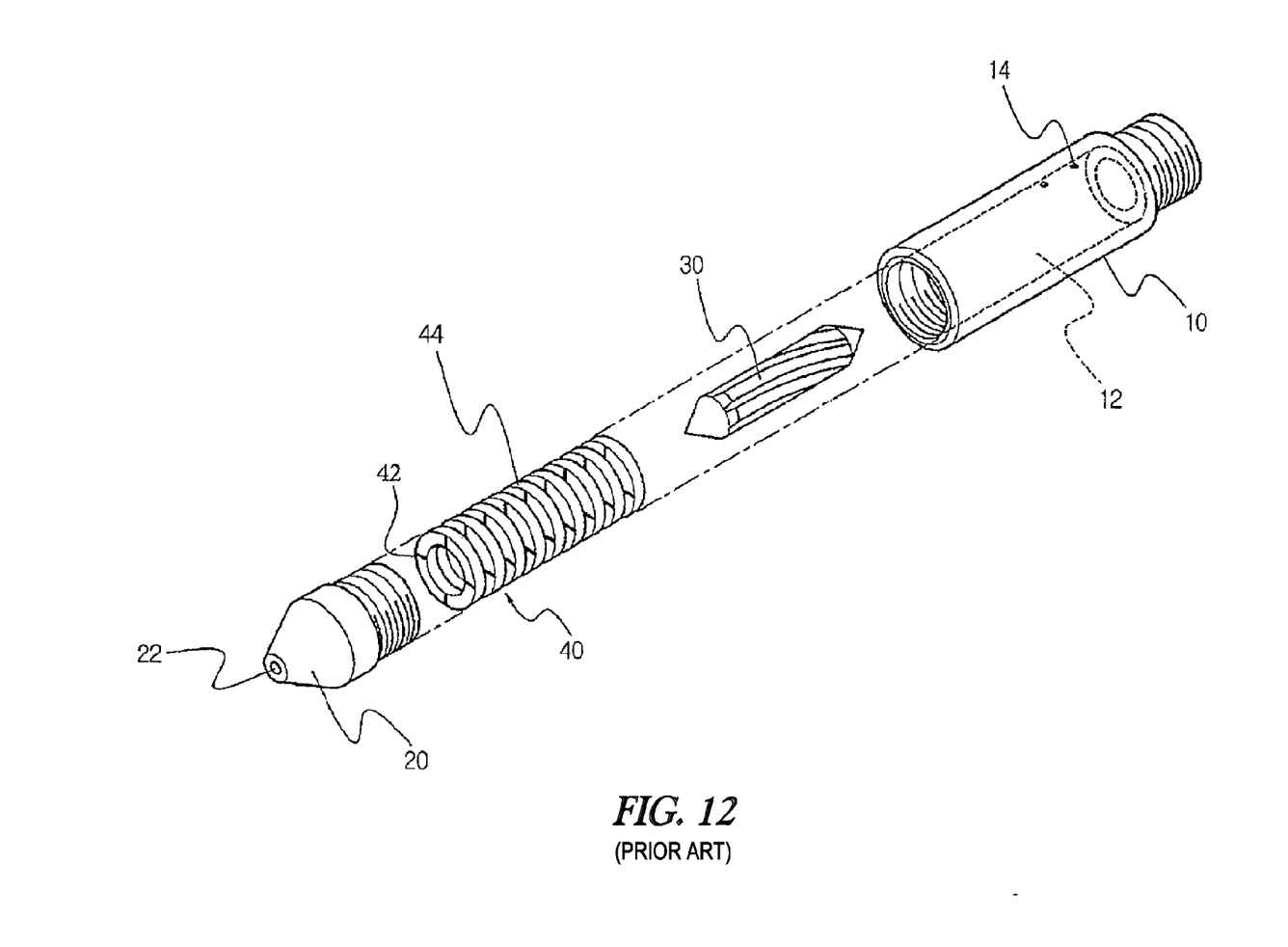
FIG. 12 is a perspective view showing an exploded conventional nozzle assembly for an injector.

As shown in FIG. 11, the supporting cylinder 500 has a hollow cylindrical shape and is mounted in the body 100. A plurality of supporting grooves 510 are formed at an interior circumference of the supporting cylinder 500. In addition, supporting cylinder protrusions 530 are formed between the supporting grooves 510.

A third gas exhaust hole 520 is formed at the supporting groove 510 such that the gas flowing to the supporting groove 510 is exhausted.

Cones 350 and 360 are formed at respective ends of the poppet 300, and first and second plastic moving grooves 310 and 320 are formed in the length direction of the poppet 300 at an exterior circumference thereof.

A vent ring support 330 is formed at one side portion of the poppet 300, and a plurality of connecting holes 340 is formed at the vent ring support 330.

The connecting hole 340 communicates the molten plastic pathway 110 with the second plastic moving groove 320. In addition, the first plastic moving groove 310 is opened toward the head 200, and the second plastic moving groove 320 is blocked toward the head 200.

Further, poppet protrusions 390 are formed between the first and second plastic moving grooves 310 and 320. The poppet protrusions 390 are alternately disposed apart from the supporting cylinder protrusions 530 by a predetermined distance d. The predetermined distance d may be 0.1-0.3 mm.

Therefore, the molten plastic supplied to the molten plastic pathway 110 flows toward the head 200 through the second plastic moving groove 320. After that, flow of the molten plastic is hindered by the blocked second plastic moving groove 320. Therefore, the molten plastic crosses to the first plastic moving groove 310 through a gap between the poppet protrusion 390 and the supporting cylinder protrusion 530. In this case, the molten plastic is flattened thinly and evenly, and the gas in the molten plastic is effectively extracted.

After that, the molten plastic flows through the first plastic moving groove 310 to the head 200, and is injected to the mold through the injecting hole 210.

Figure 10:
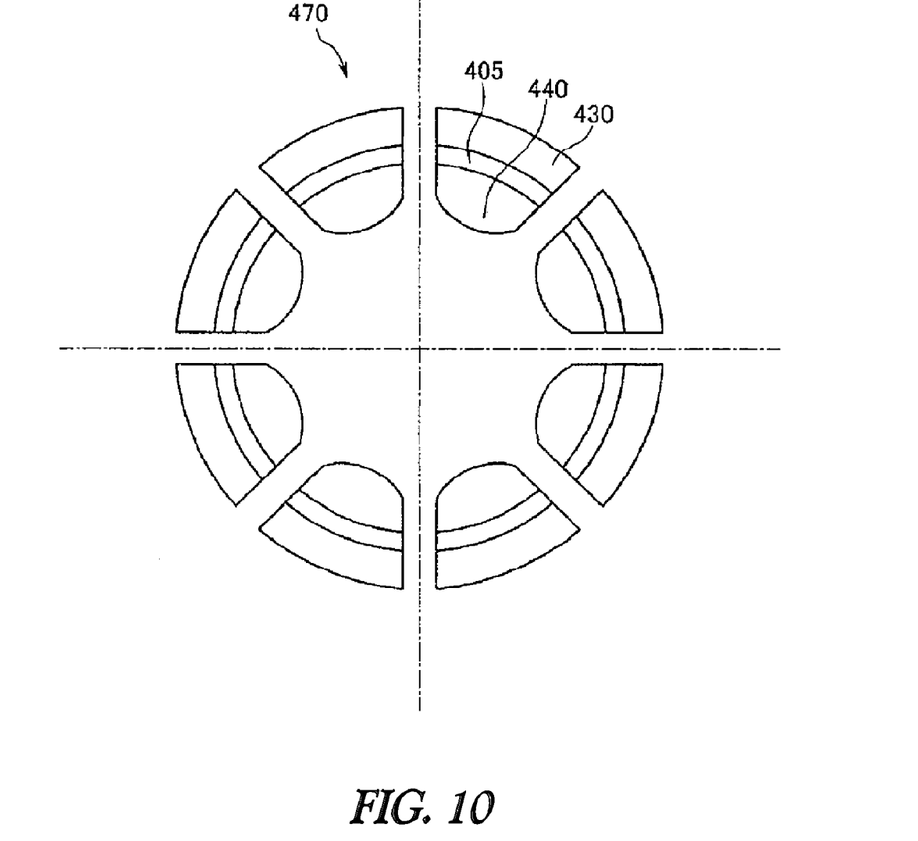
FIG. 10 is a front view showing a vent ring member of a nozzle assembly for an injector according to the second exemplary embodiment of the present invention.

As shown in FIG. 10, the vent ring member 470 is divided into a plurality of sections, and respective sections are inserted in the supporting groove 510.

In addition, an interior circumference of respective sections of the vent ring member 470 is convexly protruded, and the protruded portion is partially inserted in the first and second plastic moving grooves 310 and 320 such that the molten plastic is flattened evenly and flows, and extraction of the gas from the molten plastic is facilitated.

The vent ring member 470 includes a first protrusion portion 430, a second protrusion portion 440, and a gas storage area 405. The first protrusion portion 430 is protruded at an exterior circumference of one side of the vent ring member 470 along a length direction thereof, the second protrusion portion 440 is protruded at an interior circumference of the one side of the vent ring member 470 along the length direction thereof, and the gas storage area 405 is formed between the first protrusion portion 430 and the second protrusion portion 440.

In addition, the first protrusion portion 430 is protruded more than the second protrusion portion 440 by a predetermined length. The predetermined length may be a value that a person of ordinary skill in the art thinks preferable. The predetermined length may be 0.01-0.1 mm.

In addition, the vent ring member 470 is made of sintered metal according to the second exemplary embodiment of the present invention. In this case, the gas in the molten plastic is exhausted through cavities formed between particles of sintered metal that are formed in the vent ring member 470.

The nozzle assembly for an injector according to exemplary embodiments of the present invention further includes a vacuum pump (not shown) in order to effectively exhaust gas, and the vacuum pump is connected to the first gas exhaust hole 120.

The vacuum pump is provided at the exterior of the body 100 or is integrally formed at the body 100.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

As described above, since molten plastic at a high pressure is injected after crossing from a second plastic moving groove to a first plastic moving groove, the molten plastic is flattened thinly and evenly and gas in the molten plastic is effectively extracted according to the present invention.

In addition, since the extracted gas is exhausted through a gap between sections of the first vent ring as well as a gap in the first vent ring, the gas in the molten plastic is effectively exhausted.

Therefore, quality of injection products may be improved.

Further, since the molten plastic crosses from the second plastic moving groove to the first plastic moving groove, dyes are fully mixed with the molten plastic and dying quality of plastic products may be enhanced.

Also, since gas and tar are extracted from the molten plastic, durability of a molded product may be enhanced.

Lastly, since the gas in the body is forcibly exhausted by a vacuum pump, the gas may be completely exhausted.

The invention claimed is:

1. A nozzle assembly for an injector, comprising:
   a body having a molten plastic pathway through which the molten plastic passes;
   a head, one end thereof being connected to the body and the other end thereof being provided with an injecting hole for injecting the molten plastic;
   a poppet mounted in the body, first and second plastic moving grooves being formed in a length direction thereof at an exterior circumference thereof such that the molten plastic passes through the first and second plastic moving grooves and gas in the molten plastic is extracted; and
   a first vent ring exhausting the extracted gas to the exterior of the body, the poppet being inserted in the first vent ring,
   wherein the molten plastic pathway is only communicated with the second plastic moving groove.

2. The nozzle assembly of claim 1, wherein the first plastic moving groove is opened toward the head and the second plastic moving groove is blocked toward the head.

3. The nozzle assembly of claim 2, wherein a vent ring support is formed at one side portion of the poppet, and a connecting hole communicating the molten plastic pathway with the second plastic moving groove is formed at the vent ring support.

4. The nozzle assembly of claim 2, wherein the poppet comprises:
   a shaft;
   a cone coupled with one end of the shaft and provided with the vent ring support at which the connecting hole communicating the molten plastic pathway with the second plastic moving groove is formed; and
   a plurality of second vent rings, the shaft being inserted therein and the first and second plastic moving grooves being formed at an exterior circumference thereof.

5. The nozzle assembly of claim 1, wherein the first vent ring comprises:
   a first protrusion portion protruded at an exterior circumference of one side of the first vent ring along a length direction thereof;
   a second protrusion portion protruded at an interior circumference of the one side of the first vent ring along the length direction thereof; and
   a gas storage area formed between the first protrusion portion and the second protrusion portion.

6. The nozzle assembly of claim 5, wherein the first vent ring is divided radially into a plurality of sections.

7. The nozzle assembly of claim 5, wherein a gas moving groove is formed radially at the first protrusion portion of the first vent ring.

8. The nozzle assembly of claim 7, wherein a gas groove communicated with the gas moving groove is formed at an exterior circumference of the first vent ring.

9. The nozzle assembly of claim 5, wherein a gas moving hole is formed from an interior circumference of the first vent ring to an exterior circumference of the first vent ring.

10. The nozzle assembly of claim 5, wherein the first protrusion portion is protruded more than the second protrusion portion by a predetermined length.

11. The nozzle assembly of claim 1, wherein the first vent ring is made of sintered metal.

12. The nozzle assembly of claim 1, wherein at least one minute groove for exhausting the gas in the molten plastic is formed at one side of the first vent ring.

13. The nozzle assembly of claim 12, wherein depth of the minute groove is within 0.001-0.01 mm.

14. The nozzle assembly of claim 1, wherein a first gas exhaust hole for exhausting the extracted gas to an exterior of the body is formed from an interior circumference of the body to an exterior circumference of the body.

15. The nozzle assembly of claim 1, wherein the first vent ring is inserted in the head.

16. The nozzle assembly of claim 15, wherein a second gas exhaust hole is formed from an interior circumference of the head to an exterior circumference of the head.

17. The nozzle assembly of claim 14, wherein the first gas exhaust hole is connected with a vacuum pump.

18. A nozzle assembly for an injector, comprising:
a body having a molten plastic pathway through which molten plastic passes;
a head, one end thereof being connected to the body and the other end thereof being provided with an injecting hole for injecting the molten plastic;
a supporting cylinder mounted in the body, a plurality of supporting grooves being formed at the supporting cylinder;
a poppet mounted in the supporting cylinder, first and second plastic moving grooves being formed in a length direction thereof at an exterior circumference thereof such that the molten plastic passes through the first and second plastic moving grooves and gas in the molten plastic is extracted; and
a vent ring member divided into a plurality of sections, the plurality of sections being inserted respectively in the supporting grooves.

19. The nozzle assembly of claim 18, wherein the molten plastic pathway is only communicated with the second plastic moving groove.

20. The nozzle assembly of claim 19, wherein the first plastic moving groove is opened toward the head and the second plastic moving groove is blocked toward the head.

21. The nozzle assembly of claim 20, wherein a vent ring support is formed at one side portion of the poppet, and a connecting hole communicating the molten plastic pathway with the second plastic moving groove is formed at the vent ring support.

22. The nozzle assembly of claim 18, wherein a plurality of supporting cylinder protrusions formed between the supporting grooves are alternately disposed apart from poppet protrusions formed between the first and second plastic moving grooves by a predetermined distance.

23. The nozzle assembly of claim 18, wherein the vent ring member comprises:
a first protrusion portion protruded at an exterior circumference of one side of the vent ring member along a length direction thereof;
a second protrusion portion protruded at an interior circumference of the one side of the vent ring member along the length direction thereof; and
a gas storage area formed between the first protrusion portion and the second protrusion portion.

24. The nozzle assembly of claim 23, wherein the first protrusion portion is protruded more than the second protrusion portion by a predetermined length.

25. The nozzle assembly of claim 18, wherein a first gas exhaust hole for exhausting the extracted gas to an exterior of the body is formed from an interior circumference of the body to an exterior circumference of the body.

26. The nozzle assembly of claim 25, wherein the first gas exhaust hole is connected with a vacuum pump.

27. The nozzle assembly of claim 18, wherein a third gas exhaust hole is formed at the supporting groove.

28. The nozzle assembly of claim 18, wherein the vent ring member is made of sintered metal.

* * * * *